July 13, 1937.  H. J. NEUMILLER  2,086,735
JOINING OR SEALING MATERIAL
Filed May 7, 1932
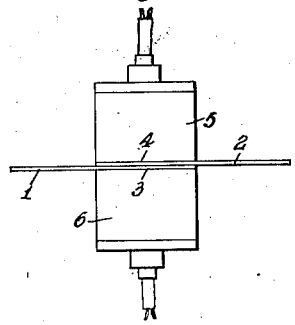
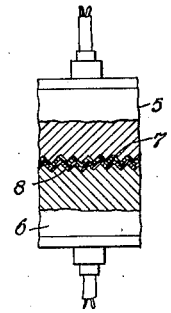
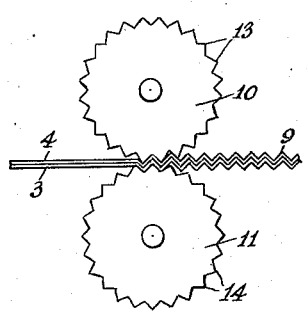
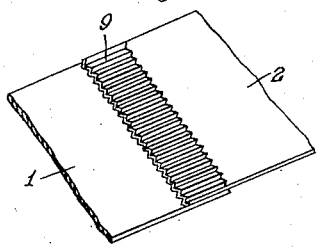
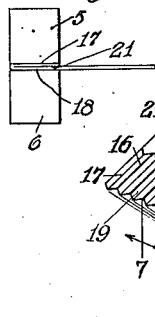
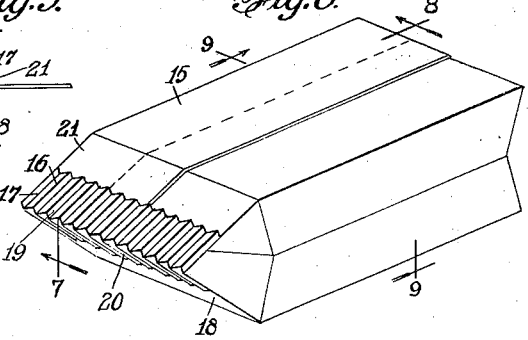
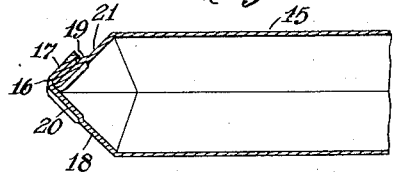
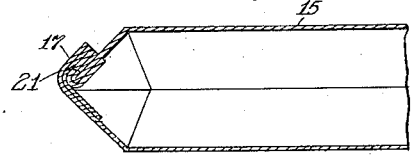
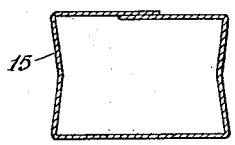
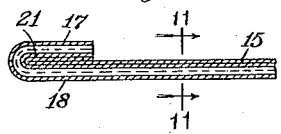
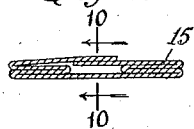
INVENTOR
Harry J. Neumiller
BY
Wm. S. Pritchard ATTORNEY Patented July 13, 1937

2,086,735

UNITED STATES PATENT OFFICE 2,086,735

JOINING OR SEALING MATERIAL

Harry J. Neumiller, Peoria, Ill., assignor, by mesne assignments, to E. I. du Pont de Nemours & Company, Wilmington, Del., a corporation of Delaware Application May 7, 1932, Serial No. 609,852

3 Claims. (Cl. 93—35)

This invention relates to joining sheets of regenerated cellulose, and more particularly to heat sealing containers made of plain regenerated cellulose.

It has been the practice to join or seal sheets and containers of plain or ordinary regenerated cellulose by means of adhesives. Such sheets of plain regenerated cellulose usually contain a softener, such as glycerin, but have no coating material such as is used to produce moistureproof sheets of regenerated cellulose.

I have found that sheets and containers of plain regenerated cellulose can be joined or sealed without the addition of any adhesive with a degree of adhesion suitable for many purposes by subjecting overlapping or folded-over portions of the sheets or containers to heat and pressure by plain surfaces, and that a greater degree of adhesion can be obtained by means of heat and crimping pressure by corrugated surfaces, and that a still greater degree of adhesion can be obtained by wetting the surfaces to be joined with a suitable softener and applying heat and crimping.

It is therefore an object of this invention to provide a method for effectively and expeditiously joining and sealing sheets and containers made of plain regenerated cellulose, without the addition of any adhesive.

The above and other objects will appear from the following description, appended claims and accompanying drawing forming a part of this specification and in which:

Figure 1 is an edge view of two overlapping sheets of plain regenerated cellulose with electrically heated dies in engagement with the overlapping portions;

Figure 2 is a fragmental view at right angles to Figure 1 with a portion of the overlapping portions of the sheets and heating dies shown in section;

Figure 3 is a view showing overlapping portions of sheets engaged by heated rolls instead of the dies shown in Figure 2;

Figure 4 is a fragmental perspective view of the overlapping sheets after being joined in the manner illustrated in Figures 1, 2, and 3;

Figure 5 is a side edge view of a container with a folded-over end engaged by opposed heated die members.

Figure 6 is a perspective view of a container in opened up condition after the end fold has been sealed by the heating dies in the manner shown in Figure 5;

Figure 7 is a longitudinal sectional view on line 7—8 of Figure 6, showing the crimping but not showing all the plies of material;

Figure 8 is a longitudinal sectional view on line 7—8 of Figure 6, showing the plies of material but not showing the crimping;

Figure 9 is a transverse sectional view on line 9—9 of Figure 6;

Figure 10 is a longitudinal sectional view on line 10—10 of Figure 11, showing the plies and folded-over end, with the container in collapsed condition; and Figure 11 is a sectional view on line 11—11 of Figure 10, showing a cross-section of the container in collapsed condition.

Referring to the drawing wherein like reference numerals designate like parts, the reference numerals 1 and 2 represent sheets of plain or uncoated regenerated cellulose, respectively, having overlapping portions 3 and 4 engaged by opposed heated dies 5 and 6 which are preferably heated electrically. The dies 5 and 6 have their opposed faces formed with corrugations or undulations 7 and 8, respectively, and, when heated to a sufficiently high temperature and applied to the sides of the overlapping portions with sufficient pressure, produce a crimped joint 9, as shown in Figure 4. The crimping effects an intermeshing of the contiguous surfaces of the overlapping portions and thereby reinforces and strengthens the tenacity of the joint or seal.

Figure 3 illustrates a modified way of forming the crimped joint by passing the overlapping sheet portions 3 and 4 between a pair of heated rotating rolls 10 and 11 which are provided, respectively, with corrugations 13 and 14, thus producing the crimped joint 9.

An advantageous application of this invention consists in forming crimped closures on containers made of plain regenerated cellulose. Referring to Figure 6, a container 15 made of plain regenerated cellulose sheeting is shown provided with a crimped end closure 16 in accordance with this invention. The crimped end closure 16 is formed while the container is preferably in a collapsed flat condition by subjecting the folded-over end portion 17 (Figure 5) and the side 18 of the container to suitable heat and pressure by means of the corrugated dies 5 and 6 or the pair of heated corrugated rolls 10 and 11, thus sealing the plies of the folded end together and causing the folded-over end portion 17 to adhere to the adjacent side 21 of the container.

The following procedure for producing crimped end closures on containers has given satisfactory results. One corrugated roll is heated electrically to about 640° F., while the other corrugated roll becomes heated to about 225° F. by rotating in contact with the heated roll with which it intermeshes. The surface speed of the rolls is about 150 inches per minute. The folded-over ends of the containers are fed through the rotating rolls with the folded-over portion 17 in contact with the roll heated to 640° F., and the side 18 of the container in contact with the other roll.

It will be observed from Figure 6 that the crimped end seal or closure 16 presents a very neat and attractive appearance as a result of the corrugations 19 and 20 formed in the folded-over end portion 17 and the side 18, respectively. Containers made in accordance with this invention may be employed for various purposes, such as for packaging small lots of cotton, tablets, powder puffs, etc.

A joint or seal may be formed by heat and pressure by plain-faced dies or rolls without crimping, although the strength or adhesion of the joint or seal is not as great as where crimping is used, but it is strong enough for some uses.

When a joint or seal of greater strength or adhesion than is produced by heat and crimping alone is desired, the surfaces to be joined or sealed are wetted with a suitable softener, such as water, glycerol, diethylene glycol, monoethyl ether of diethylene glycol, etc., or a mixture of two or more of such softeners, in any convenient manner prior to applying heat and crimping pressure.

Since it is obvious that various changes and modifications may be made in the above description without departing from the nature or spirit thereof, this invention is not restricted thereto except as set forth in the appended claims.

I claim:

1. The process of forming a closure for a container of uncoated transparent regenerated cellulose sheeting comprising folding over an end portion of said container against a side of the container and subjecting the folded-over portion and an unfolded portion of the container to heat and pressure, the degree of heat applied against the folded-over portion being much greater than the degree of heat applied against the unfolded portion.

2. The process of forming a closure for a container of uncoated transparent regenerated cellulose sheeting comprising folding over an end portion of said container against a side of the container and subjecting the folded-over portion and an unfolded portion of the container to heat and crimping, the degree of heat applied against the folded-over portion being much greater than the degree of heat applied against the unfolded portion.

3. The process of forming a closure for a container of uncoated transparent regenerated cellulose sheeting comprising folding over an end portion of said container against a side of the container and subjecting the folded-over portion and an unfolded portion of the container to water, heat and crimping, the degree of heat applied against the folded-over portion being much greater than the degree of heat applied against the unfolded portion.

HARRY J. NEUMILLER.